United States Patent
Park et al.

(10) Patent No.: US 9,634,486 B2
(45) Date of Patent: Apr. 25, 2017

(54) DYNAMIC POWER RAIL CONTROL FOR CLUSTERS OF LOADS

(71) Applicant: QUALCOMM Incorporated, San Diego, CA (US)

(72) Inventors: Hee Jun Park, San Diego, CA (US); Yuancheng Christopher Pan, Saratoga, CA (US); Christopher Kong Yee Chun, Austin, TX (US)

(73) Assignee: QUALCOMM INCORPORATED, San Diego, CA (US)

( * ) Notice: Subject to any disclaimer, the term of this patent is extended or adjusted under 35 U.S.C. 154(b) by 271 days.

(21) Appl. No.: 14/327,410

(22) Filed: Jul. 9, 2014

(65) Prior Publication Data
US 2016/0013643 A1    Jan. 14, 2016

(51) Int. Cl.
G06F 1/28 (2006.01)
H02J 3/00 (2006.01)
H02J 1/00 (2006.01)
H02J 1/10 (2006.01)

(52) U.S. Cl.
CPC ............ H02J 3/00 (2013.01); G06F 1/28 (2013.01); H02J 1/00 (2013.01); H02J 1/102 (2013.01)

(58) Field of Classification Search
CPC .................... G06F 1/28; H02J 1/00
See application file for complete search history.

(56) References Cited

U.S. PATENT DOCUMENTS 6,121,693 A * 9/2000 Rock .................. H02J 1/10
307/18
2006/0145538 A1 * 7/2006 Proefrock ............. H02J 1/08
307/18
2010/0133317 A1 6/2010 Shelton, IV et al.
2011/0093733 A1 * 4/2011 Kruglick .............. G06F 1/3203
713/340
2013/0021091 A1 * 1/2013 Robertson ........... G06F 1/3203
327/540

(Continued)

FOREIGN PATENT DOCUMENTS

EP        0690554 A2    1/1996
WO    2006072041 A2    7/2006

OTHER PUBLICATIONS

International Search Report and Written Opinion issued in PCT/US2015/031006 on Jul. 29, 2015—ISA/EPO in 9 pages.

(Continued)

Primary Examiner — Thomas Lee
Assistant Examiner — Gary Collins
(74) Attorney, Agent, or Firm — Procopio, Cory, Hargreaves & Savitch LLP (57) ABSTRACT

Managing power rails, including: a plurality of power rails, each power rail coupled to at least one power supply and configured to support a plurality of similarly-configured loads; and a power rail controller configured to merge and split the plurality of power rails based on total power consumption of the plurality of similarly-configured loads. The power rail management also determines the optimal power rail mode (merge/split) based on current load of each rail and adjusts the dynamic clock and voltage scaling policy, workload allocation on each core, and performance limit/throttling management according to the power rail mode.

23 Claims, 3 Drawing Sheets

(56) References Cited

U.S. PATENT DOCUMENTS

| | | | |
|---|---|---|---|
| 2013/0162044 A1* | 6/2013 | Mangattur | G06F 1/3287 307/64 |
| 2013/0293012 A1* | 11/2013 | Song | H02J 4/00 307/24 |
| 2014/0203639 A1* | 7/2014 | Rozman | H02J 1/00 307/28 |
| 2015/0171631 A1 | 6/2015 | Duell et al. | |
| 2015/0200541 A1 | 7/2015 | Gorla et al. | |
| 2016/0013654 A1* | 1/2016 | Saha | H02J 1/14 307/29 |

OTHER PUBLICATIONS

Second Written Opinion from International Application No. PCT/US2015/031006, mailed Jul. 1, 2016, 7 pages.

\* cited by examiner

DYNAMIC POWER RAIL CONTROL FOR CLUSTERS OF LOADS

BACKGROUND

Field

This invention relates to dynamic power rail control, and more specifically, to merging and splitting of the power supplied to the plurality of power rails.

Background

Integrated circuits have grown increasingly complex. Thus, a single integrated circuit may include a large of number of processors. Further, the peak current per processor has also been increasing. Accordingly, multiple power rails may be used to power different types of processors.

SUMMARY

The present invention provides for dynamically managing and controlling the multiple power rails including tasks such as power rail merge and split control, voltage feedback control, output voltage control, dynamic clock frequency and voltage scaling (DCVS) control, and task migration control.

In one embodiment, a power rail management system is disclosed. The system includes: a plurality of power rails, each power rail coupled to at least one power supply and configured to support a plurality of similarly-configured loads; and a power rail controller configured to merge and split the plurality of power rails based on total power consumption of the plurality of similarly-configured loads.

In another embodiment, an apparatus for managing a plurality of power rails is disclosed. The apparatus includes: means for coupling a plurality of similarly-configured loads to at least one power supply through each power rail of the plurality of power rails; and means for merging and splitting the plurality of power rails based on total power consumption of the plurality of similarly-configured loads.

In yet another embodiment, a method for managing a plurality of power rails is disclosed. The method includes: coupling a plurality of similarly-configured loads to at least one power supply through each power rail of the plurality of power rails; and merging and splitting the plurality of power rails based on total power consumption of the plurality of similarly-configured loads.

Other features and advantages of the present invention should be apparent from the present description which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

As stated above, an integrated circuit may include a large number of processors. Thus, multiple power rails may be used to power the processors. With the presence of multiple power rails, systems and methods for dynamic power rail control and management are desirable.

Certain embodiments as described herein provide for dynamically managing and controlling the multiple power rails including tasks such as power rail merge and split control, voltage feedback control, output voltage control, dynamic clock frequency and voltage scaling (DCVS) control, and task migration control. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

Figure 1:
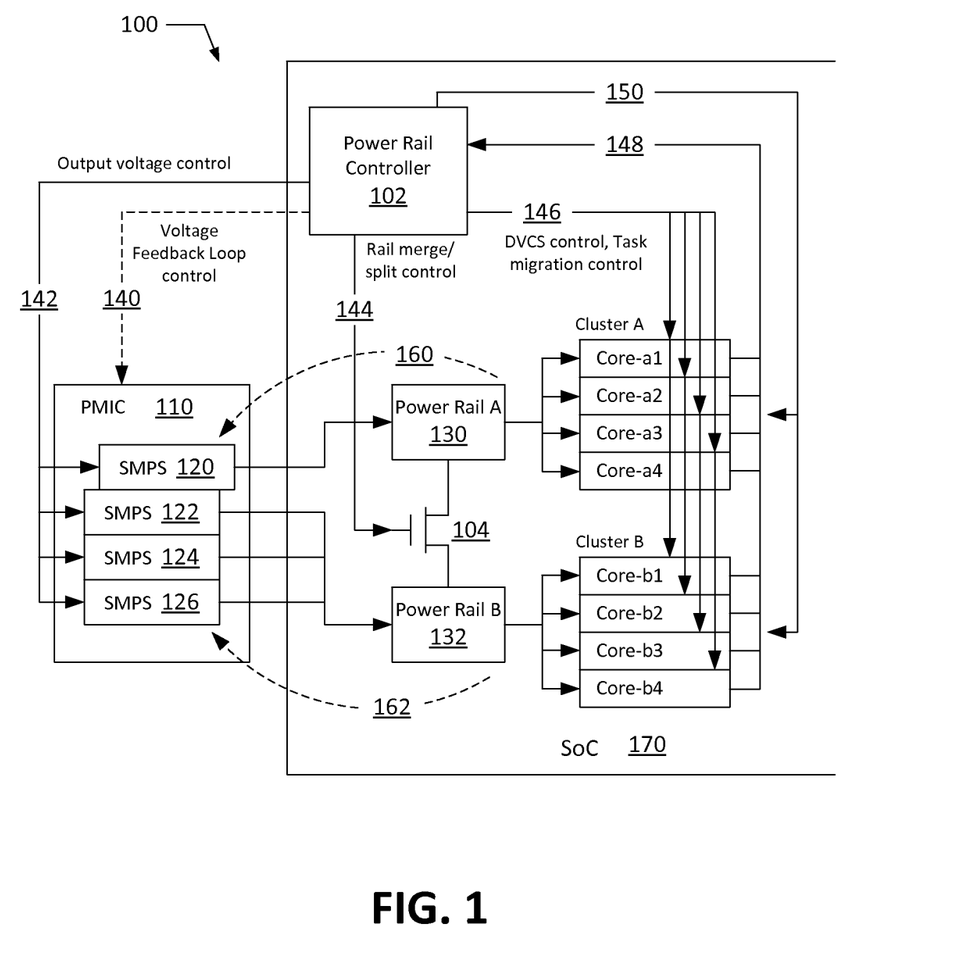
FIG. 1 is a functional block diagram illustrating a dynamic power rail management system in accordance with one embodiment of the present invention.

FIG. 1 is a functional block diagram illustrating a dynamic power rail management system 100 in accordance with one embodiment of the present invention. The dynamic power rail management system 100 comprises a power rail controller 102 and a field-effect transistor (FET) switch 104 used for the power rail merge and split control. The power rail controller 102 operates in conjunction with a power management integrated circuit (PMIC) 110. In other embodiments of the power rail merge and split control, element(s) other than a FET switch, such as a mechanical switch, can be used. Although FIG. 1 shows only one switch since there are only two power rails, when more than two power rails are involved, multiple switches are used to control multiple power rails.

In the illustrated embodiment of FIG. 1, the PMIC 110 includes, among other elements, a plurality of switched-mode power supplies (SMPS) 120, 122, 124, 126 configured to supply power to a plurality of loads which is grouped into clusters (e.g., Cluster A and Cluster B) with each cluster including a group of similarly-configured processors (e.g., Core-a1 to Core-a4 for Cluster A and Core-b1 to Core-b4 for Cluster B). Cluster A is coupled to a first power rail (Power Rail A) 130, while Cluster B is coupled to a second power rail (Power Rail B) 132. Thus, in one embodiment, a plurality of similarly-configured loads is coupled to each power rail, wherein the term "similarly-configured loads" refers to loads that are similar in size, power, or other relevant characteristics such as throughput and processing power. Further, the term "loads" can refer to any type of loads including processors, memories, interfaces, or combination of different types of loads.

In the illustrated embodiment of FIG. 1, PMIC 110 allocates one SMPS 120 for the first power rail 130, while three SMPSs 122, 124, 126 are allocated for the second power rail 132. Accordingly, in one embodiment, Core-a1 to Core-a4 are configured as small processors, while Core-b1 to Core-b4 are configured as large processors. In a heterogeneous computing architecture, small processors have lower performance and lower power consumption compared to large processors which have higher performance and higher power consumption. In the example of FIG. 1, since PMIC 110 allocates one SMPS 120 for the first power rail 130 coupled to the small processors and allocates three SMPSs 122, 124, 126 for the second power rail 132 coupled to the large processors, the large processors can be configured as three times larger than the small processors in size, amount of power consumed, throughput, MIPS rating, and/or other related parameters.

In the illustrated embodiment of FIG. 1, the cores of Cluster A and Cluster B, the power rail controller 102, power rails 130, 132, and the switch 104 all reside on a system-on-chip (SoC) 170 and the SMPSs 120-126 reside within the PMIC 110. In an alternative embodiment, the power rail controller 102, power rails 130, 132, and the switch 104 may be included within the PMIC 110 or on a motherboard as separate elements. In another alternative embodiment, the power rail controller 102 can be implemented in software that executes, for example, on one of the cores of SoC 170.

Figure 2:
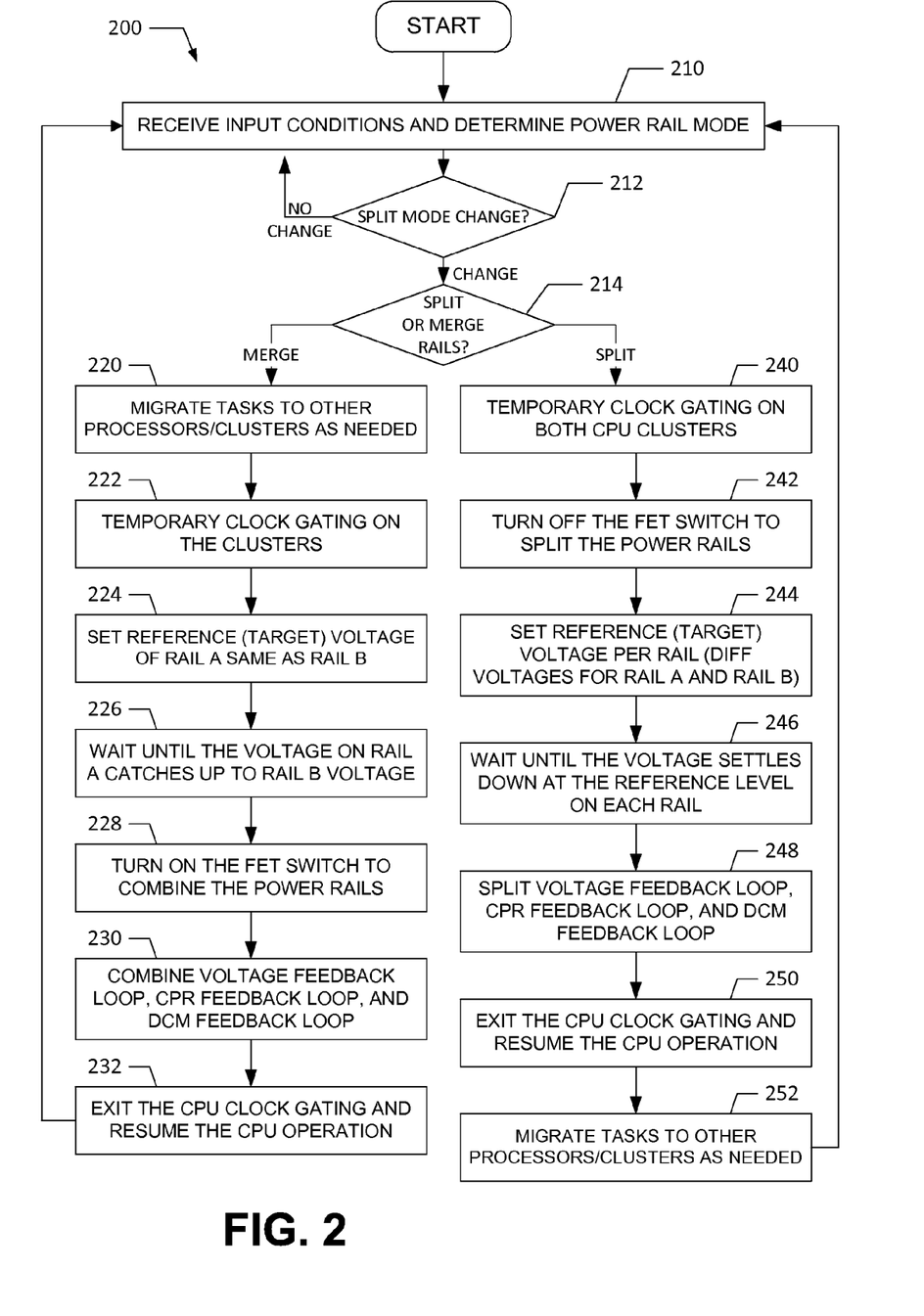
FIG. 2 is a flow diagram illustrating a rail merging and splitting process in accordance with one embodiment of the present invention.

FIG. 2 is a flow diagram 200 illustrating a rail merging and splitting process in accordance with one embodiment of the present invention. The rail merging and splitting process receives information from the loads coupled to the power rails regarding certain input conditions including current load of each cluster and determines the rail mode (i.e., merge or split), at step 210, and generates/executes output controls (e.g., rail mode, DCVS control, task control, voltage control, and core power reduction (CPR)/digital current meter (DCM) control), at steps 220 through 252. Steps 210 through 252 of the process illustrate various output controls generated and executed in accordance with the input conditions. At step 212, the power rail controller 102 determines if the input condition necessitates a change in the split mode. If no change is required, the process returns to step 210. Otherwise, if the change in the split mode is required, the power rail controller 102 determines, at step 214, if the power rails should be split or merged. If the input condition necessitates a merge in the power rails, steps 220 to 232 are performed, otherwise if the input condition necessitates a split in the power rails, steps 240 to 252 are performed.

separate power reduction loop 150 for each cluster; and separate measured power feedback 148 per processor. The load can be measured in current or power with embedded current/power meters in the SoC 170 or can be estimated based on operating frequency, voltage, and/or temperature. In one example shown in FIG. 1, the cluster A load consists of four small processors, while the cluster B load consists of four large processors, the total power consumption of the cluster A load ranges from 0 to 3 W, the cluster B load ranges from 0 to 12 W, and the cluster A+B load ranges from 0 to 15 W. Further, assuming one SMPS is connected to Power Rail A and three SMPSs are connected to Power Rail B (as shown in FIG. 1), Threshold A is set at approximately 3.5 W, Threshold B is set at approximately 10.5 W, and Threshold AB is set at approximately 14 W. As stated above, the power rail controller 102 receives the above input conditions and generates output controls.

According to the fourth row of Table 1, when the cluster A load is below a pre-defined Threshold A, and the cluster B load is above a pre-defined Threshold B, while the cluster A+B load is below another pre-defined Threshold AB, the output controls are set as follows: merge the power rails and control them as one; processors of cluster B override the voltage of the merged power rails (i.e., the cluster B processors control the voltage of the merged rail and prevent the

TABLE 1

| Input Condition | | | Output Control | | | |
|---|---|---|---|---|---|---|
| Cluster A Load | Cluster B Load | Cluster A + B Load | Rail Control | DCVS Control | Task Control | Voltage feedback/ CPR/DCM limit managements |
| <Threshold A | <Threshold B | Don't care | Split | DCVS per cluster | Regular | Feedback loop per rail |
| <Threshold A | >Threshold B | <Threshold AB | Merge | Cluster B override the voltage; Cluster A adjust the frequency | Cluster A-to-A or A-to-B migration if needed | Combined feedback loop |
| <Threshold A | >Threshold B | >Threshold AB | Merge | Cluster B override voltage; All cluster A's power collapsed | All tasks in cluster A migrated to cluster B | Combined feedback loop + DCM limit management |
| <<Threshold A (very light load) | <<Threshold B (very light load) | Don't care | Merge | Same low operating voltage for all clusters | Task allocation to cluster A or B according to performance demand | Combined feedback loop |

Table 1 shown above summarizes the various output controls generated and executed by the power rail controller 102 in accordance with the input conditions. In the embodiment shown in Table 1, the output controls are generated assuming that the loads of cluster A are small processors, while the loads of cluster B are large processors. However, in other embodiments, the processors of cluster A and cluster B can be configured differently. According to the third row of Table 1, when the cluster A load is below a pre-defined Threshold A and the cluster B load is below another pre-defined Threshold B, the output controls are set by the power rail controller 102 as follows: split the power rails and control them separately using a rail merge/split control line 144; separate voltage and frequency control 142 for each cluster; no migration of tasks by task migration control 146; separate voltage feedback loop 160, 162 for each power rail; cluster A processors from controlling the voltage of the merged rail), while the processors of cluster A adjust its frequency for the rail voltage on the merged rail; task migration controls may include migrations of tasks within the processors of cluster A (e.g., rather than spreading tasks among the four cores of cluster A, migrate the tasks to one or two cores so that the remaining cores can be power collapsed) or migration from cluster A processors to cluster B processors, if needed; combined voltage feedback loop for the merged power rail; and combined core power reduction (CPR) loop for all clusters. CPR senses the remaining voltage margin on each rail in real-time and performs the fine-granularity adjustment of the supply voltage for power reduction.

According to the fifth row of Table 1, when the cluster A load is below a pre-defined Threshold A, and the cluster B load is above a pre-defined Threshold B, while the cluster A+B load is also above another pre-defined Threshold AB, the output controls are set as follows: merge the power rails and control them as one; processors of cluster B override the voltage, while power to the processors of the cluster A is collapsed; task migration controls may include migrations of all tasks within the processors of cluster A migrating to the processors of cluster B; combined voltage feedback loop for the merged power rail; combined CPR loop for all clusters; and Digital Current Meter (DCM) limit management. DCM limit management measures or estimates current of each rail and protects the power supply from high peak current by temporarily limiting the core performance or load amount.

According to the sixth row of Table 1, when the cluster A load is significantly below a pre-defined Threshold A (very light load), and the cluster B load is also significantly below another pre-defined Threshold B (very light load), the output controls are set as follows: merge the power rails and control them as one; same low operating voltage is set for all clusters; task migration controls may include allocation of tasks to processors of clusters A and B according to performance demands; combined voltage feedback loop for the merged power rail; and combined CPR loop for all clusters. In one embodiment, the load is "significantly below" if it is at least 50 times smaller than the pre-defined Thresholds A or B. Thus, in the above example in which Threshold A is 3.5 W and Threshold B is 10.5 W, a Cluster A load would be a very light load if it is below about 0.07 W (or 70 mW) and a Cluster B load would be a very light load if it is below about 0.21 W (or 210 mW).

Returning to FIG. 2 regarding the rail merging and splitting process, if the power rail controller 102 determines to merge the power rails, steps 220 to 232 are performed. At step 220, the power rail controller 102 migrates the tasks to other processors or clusters as needed, depending on the load levels of the clusters. For example, when the cluster A load is below a pre-defined Threshold A, and the cluster B load is above a pre-defined Threshold B, while the cluster A+B load is below another pre-defined Threshold AB, the tasks are either migrated within the processors of cluster A or migrated from cluster A processors to cluster B processors as needed. In another example, when the cluster A load is below a pre-defined Threshold A, and the cluster B load is above a pre-defined Threshold B, while the cluster A+B load is also above another pre-defined Threshold AB, all tasks within the processors of cluster A are migrated to the processors of cluster B. In a further example, when the cluster A load and the cluster B load are both very light, the task migration may not be necessary, but the power rail controller 102 can determine whether to migrate tasks according to the performance demands of the processors.

Once the tasks are appropriately migrated, the clocks driving the processors of the clusters are temporarily gated by the power rail controller 102, at step 222, to pause all processes running on the processors so that the processors stop once the current instructions are completed. The power rail controller 102 merges voltages of the power rails at steps 224, 226, 228. The target or reference voltage of one power rail is set to the same voltage as the voltage of the other power rail, at step 224. For example, referring to FIG. 1, the target voltage of Power Rail A 130 is set to the same voltage as the voltage of Power Rail B 132. The process then waits, at step 226, until the voltage on Power Rail A 130 is the same as the voltage on Power Rail B 132. At step 228, the FET switch 104 is turned on to merge the power rails. The merging of the voltages on the power rails as described above involves a voltage feedback control using line 140, 160, 162 shown in FIG. 1.

Figure 3:
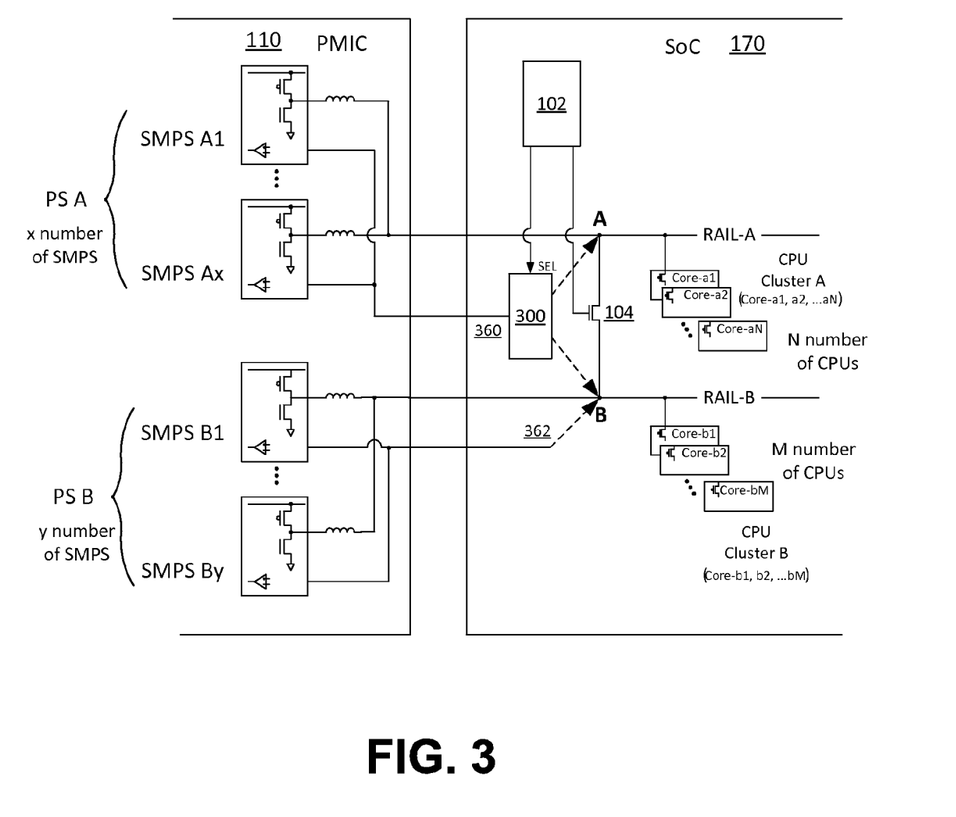
FIG. 3 is a partial view of the dynamic power rail management system highlighting the portion involved in the voltage merging and splitting process in accordance with one embodiment of the present invention.

FIG. 3 is an alternative view of the dynamic power rail management system 100 that highlights portions of system 100 involved in the voltage merging and splitting process, as well as the voltage feedback process, in accordance with one embodiment of the present invention. In the illustrated embodiment of FIG. 3, Core-a1 through Core-aN (N number of cores) are grouped into cluster A which is coupled to Power Rail A, and Core-b1 through Core-bM (M number of cores) are grouped into cluster B which is coupled to Power Rail B. SMPS A1 through SMPS Ax (x number of SMPSs) are grouped into power supply group A (PS A) which supplies Power Rail A, while SMPS B1 through SMPS By (y number of SMPSs) are grouped into power supply group B (PS B) which supplies Power Rail B.

Prior to the power rails being merged, the power levels of Power Rail A and Power Rail B are separately managed by the power rail controller 102. The voltage sense point of a voltage feedback loop for Power Rail A is at point A, while the voltage sense point of a voltage feedback loop for Power Rail B is at point B. The voltage feedback loop is part of the PMIC 110 that senses the voltage level at a specific point (e.g., point A or B in FIG. 3) and feeds back the sensed voltage to each power supply (e.g., SMPS) which adjusts its output voltage to maintain a target voltage at the specific point. When the power rails are to be merged, the target voltage of Power Rail A is set to the same voltage as the voltage of Power Rail B (step 224) and the process waits until the voltage on Power Rail A is the same as the voltage on Power Rail B (step 226). Once the voltage on Power Rail A is equal to the voltage on Power Rail B, the FET switch 104 is turned on to merge the power rails (step 228). In other embodiments, the configuration of the FET switch 104 may include having multiple small FET switches in parallel during the power rail merge process in which one or few of the small FET switches are turned on at any one time so that the merging occurs gradually without any current spikes. The voltage feedback loop is then merged (step 230) using an analog multiplexer 300 (or other switching mechanisms; a 2-1 multiplexer is shown) to move the sense point for PS A from point A to point B. Thus, the voltage feedback loop for the power supplies of PS A (SMPS A1 through SMPS An) are merged with the voltage feedback loop for the power supplies of PS B (SMPS B1 through SMPS Bn). The power supplies of PS A now adjust the voltage level of Power Rail A to be the same voltage as Power Rail B based on the newly-sensed voltage (at point B).

Returning again to FIG. 2, once the power rails are merged, the feedback loops such as the voltage feedback loop, the CPR feedback loop (used for fine tuning of the core power), and the DCM feedback loop are merged as well, at step 230. As stated above, the CPR and DCM feedback loops are combined for all clusters. The core clock gating is terminated and the core operation is resumed, at step 232.

Steps 240 to 252 show the power rail split process performed by the power rail controller 102 which should be reverse of the merge process described in steps 220 to 232. As a result of the query made at step 214, if the input condition necessitates a split of the power rails, steps 240 to 252 are performed. The power rail controller 102 temporarily gates the clocks driving the processors of the clusters using line 150 (in FIG. 1), at step 240, to pause all processes running on the processors so that the processors stop once the current instructions are completed. At step 242, the power rail controller 102 turns off FET switch 104 to split power rails A and B. The power rail controller 102 also notifies voltage feedback, DVCS, CPR, DCM control logics about the splitting of the power rails, at step 244. SMPSs will then start driving a different voltage for each power rail. At step 246, the power rail controller 102 either (1) waits for a certain amount time for the power rails to settle down to some target values or (2) senses voltages periodically and waits until the sensor indicates the target values.

In the example shown in FIG. 3, prior to the power rails being split, the power levels of Power Rail A and Power Rail B are managed together. The voltage sense point of a voltage feedback loop for both Power Rail A and Power Rail B is at point B. The power rails are then split by turning the FET switch 104 off (step 242) and setting the target voltages of Power Rail A and Power Rail B separately (step 244). Further, the process waits for each power rail to settle down to a set target voltage (step 246). During this period, the power rail controller 102 controls the analog multiplexer 300 (or any other switching mechanism) to switch the voltage sense point for PS A from point B back to point A. Thus, the voltage feedback loop for the power supplies of PS A (SMPS A1 through SMPS An) is separated with the feedback sense point at point A. The voltage feedback loop for the power supplies of PS B is maintained with the feedback sense point at point B. Thus, in FIG. 3, sense line 360 is similar to sense line 160 in FIG. 1 and sense line 362 is similar to sense line 162 in FIG. 1. In other embodiments, the FET switch 104 may be implemented as a set of parallel FET switches. Each of the parallel FET switches has its source terminal connected to power rail A and its drain terminal connected to power rail B. The gates of the parallel FET switches may be controlled individually. As a result, one method of joining power rails A and B may involve turning on a first one of the parallel FET switches, then turning on a second of the parallel FET switches, and so on until all of the parallel FET switches are on. Accordingly, this gradual turn on of the parallel FET switches prevents current spikes because the resistance between power rail A and power rail B may decrease over time as individual FET switches are turned on.

Referring back again to FIG. 2, once the power rails are split, the feedback loops such as the voltage feedback loop, the CPR feedback loop, and the DCM feedback loop are also split, at step 248. The core clock gating is terminated and the core operation is resumed, at step 250. Finally, the tasks are migrated to other processors/clusters, at step 252, as needed.

Although several embodiments of the invention are described above, many variations of the invention are possible. For example, although the illustrated embodiments use two power rails with two clusters of loads, any number of power rails and clusters of loads may be used. Further, features of the various embodiments may be combined in combinations that differ from those described above. Moreover, for clear and brief description, many descriptions of the systems and methods have been simplified. Many descriptions use terminology and structures of specific standards. However, the disclosed systems and methods are more broadly applicable.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative logical blocks, units, steps, components, and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Further, circuits implementing the embodiments and functional blocks and modules described herein can be realized using various transistor types, logic families, and design methodologies.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A power rail management system, comprising:
   a plurality of power rails, each power rail coupled to at least one power supply and configured to support a plurality of similarly-configured loads;
   a power rail controller configured to merge and split the plurality of power rails based on total power consumption of the plurality of similarly-configured loads, which includes loads that are similar in size, power, throughput and processing power,
   wherein the plurality of similarly-configured loads is a plurality of similarly-sized processors, which is one of a plurality of small processors or a plurality of large processors,
   wherein a large processor is at least three times larger than a small processor in size, amount of power consumed, throughput, and million-instructions-per-second (MIPS) rating,
   wherein the plurality of power rails comprises at least a first power rail and a second power rail, the first power rail coupled to and supporting the plurality of small processors and the second power rail coupled to and supporting the plurality of large processors; and
   a switch coupled to the plurality of power rails,
   wherein the power rail controller is configured to open the switch to split the plurality of power rails and to set a first target voltage for the first power rail and a second target voltage for the second power rail, when the total power consumption of the plurality of small processors is below a first threshold value and the total power consumption of the plurality of large processors is below a second threshold value.

2. The power rail management system of claim 1, further comprising
a sense point coupled to said each power rail and configured to sense voltage of said each power rail.

3. The power rail management system of claim 2, wherein the power rail controller is configured to set a single target voltage for the plurality of power rails when the power rails of the plurality are merged.

4. The power rail management system of claim 3, further comprising
a switch coupled to the plurality of power rails,
wherein the power rail controller is configured to close the switch to merge the plurality of power rails and to confirm that voltages on the plurality of power rails have reached the single target voltage based on the voltages fed back from the sense points of the plurality of power rails.

5. The power rail management system of claim 4, further comprising
a multiplexer configured to switch the sense point of a first power rail of the plurality of power rails to the sense point of a second power rail of the plurality of power rails when the first power rail and the second power rail are merged.

6. The power rail management system of claim 1, wherein the power rail controller is configured to migrate tasks running on the plurality of small processors to the plurality of large processors,
when the total power consumption of the plurality of small processors is below a first threshold value, the total power consumption of the plurality of large processors is above a second threshold value, and the total power consumption of combined small and large processors is above a combined third threshold value.

7. The power rail management system of claim 1, wherein the power rail controller is configured to migrate tasks running on the plurality of small processors to one of the plurality of small processor or the plurality of large processors as needed,
when the total power consumption of the plurality of small processors is below a first threshold value, the total power consumption of the plurality of large processors is above a second threshold value, but the total power consumption of combined small and large processors is below a combined third threshold value.

8. The power rail management system of claim 1, wherein the power rail controller is configured to perform dynamic clock and voltage scaling (DCVS) when the power rails of the plurality are merged, wherein the plurality of small processors adjusts its frequency for a single target voltage on merged power rails, while the plurality of large processors overrides the single target voltage on the merged power rails,
when the total power consumption of the plurality of small processors is below a first threshold value, the total power consumption of the plurality of large processors is above a second threshold value, and the total power consumption of combined small and large processors is below a combined third threshold value.

9. The power rail management system of claim 1, wherein the power rail controller is configured to perform DCVS when power rails of the plurality are merged, wherein the plurality of small processors migrates tasks and collapses its power, while the plurality of large processors overrides a single target voltage on the merged power rails,
when the total power consumption of the plurality of small processors is below a first threshold value, the total power consumption of the plurality of large processors is above a second threshold value, and the total power consumption of combined small and large processors is above a combined third threshold value.

10. An apparatus for managing a plurality of power rails, comprising:
means for coupling a plurality of similarly-configured loads to at least one power supply through each power rail of the plurality of power rails;
means for merging and splitting the plurality of power rails based on total power consumption of the plurality of similarly-configured loads, which includes loads that are similar in size, power, and other relevant characteristics including throughput and processing power,
wherein the plurality of similarly-configured loads is a plurality of similarly-sized processors, which is one of a plurality of small processors or a plurality of large processors,
wherein a large processor is at least three times larger than a small processor in size, amount of power consumed, throughput, and million-instructions-per-second (MIPS) rating,
wherein the plurality of power rails comprises at least a first power rail and a second power rail, the first power rail coupled to and supporting the plurality of small processors and the second power rail coupled to and supporting the plurality of large processors; and
means for switching coupled to the plurality of power rails,
wherein the power rail controller is configured to open the means for switching to split the plurality of power rails and to set a first target voltage for the first power rail and a second target voltage for the second power rail,
when the total power consumption of the plurality of small processors is below a first threshold value and the total power consumption of the plurality of large processors is below a second threshold value.

11. The apparatus of claim 10, further comprising
means for coupling a sense point to said each power rail to sense voltage of said each power rail.

12. The apparatus of claim 11, further comprising
means for setting a single target voltage for the plurality of power rails when the power rails of the plurality are merged.

13. The apparatus of claim 12, further comprising
means for merging plurality of power rails and confirming that voltages on the plurality of power rails have reached the single target voltage based on the voltages fed back from the sense points of the plurality of power rails.

14. The apparatus of claim 13, wherein the means for switching is configured to switch the sense point of the first power rail of the plurality of power rails to the sense point of the second power rail of the plurality of power rails.

15. A method for managing a plurality of power rails, comprising:
coupling a plurality of similarly-configured loads to at least one power supply through each power rail of the plurality of power rails; and
merging and splitting the plurality of power rails based on total power consumption of the plurality of similarly-configured loads, which includes loads that are similar in size, power, and other relevant characteristics including throughput and processing power, wherein the plurality of similarly-configured loads is a plurality of similarly-sized processors, which is one of a plurality of small processors or a plurality of large processors, wherein a large processor is at least three times larger than a small processor in size, amount of power consumed, throughput, and million-instructions-per-second (MIPS) rating wherein the plurality of power rails comprises at least a first power rail and a second power rail, the first power rail coupled to and supporting the plurality of small processors and the second power rail coupled to and supporting the plurality of large processors; and opening a switch to split the plurality of power rails and to set a first target voltage for the first power rail and a second target voltage for the second power rail, when the total power consumption of the plurality of small processors is below a first threshold value and the total power consumption of the plurality of large processors is below a second threshold value.

16. The method of claim 15, further comprising
coupling a sense point to said each power rail to sense voltage of said each power rail.

17. The method of claim 16, further comprising
setting a single target voltage for the plurality of power rails when the power rails of the plurality are merged.

18. The method of claim 17, further comprising
merging the the plurality of power rails and confirming that voltages on the plurality of power rails have reached the single target voltage based on the voltages fed back from the sense points of the plurality of power rails.

19. The method of claim 18, further comprising
switching the sense point of the first power rail of the plurality of power rails to the sense point of the second power rail of the plurality of power rails when the first power rail and the second power rail are merged.

20. The method of claim 15, further comprising
migrating tasks running on the plurality of small processors to the plurality of large processors,
when the total power consumption of the plurality of small processors being below a first threshold value, the total power consumption of the plurality of large processors is above a second threshold value, and the total power consumption of combined small and large processors is above a combined third threshold value.

21. The method of claim 15, further comprising
migrating tasks running on the plurality of small processors to one of the plurality of small processor or the plurality of large processors as needed,
when the total power consumption of the plurality of small processors is below a first threshold value, the total power consumption of the plurality of large processors is above a second threshold value, but the total power consumption of combined small and large processors is below a combined third threshold value.

22. The method of claim 15, further comprising
performing DCVS when the power rails of the plurality are merged, wherein the plurality of small processors adjusts its frequency for a single target voltage on merged power rails, while the plurality of large processors overrides the single target voltage on the merged power rails,
when the total power consumption of the plurality of small processors is below a first threshold value, the total power consumption of the plurality of large processors is above a second threshold value, and the total power consumption of combined small and large processors is below a combined third threshold value.

23. The method of claim 15, further comprising
performing DCVS when the power rails of the plurality are merged, wherein the plurality of small processors migrates tasks and collapses its power, while the plurality of large processors overrides a single target voltage on the merged power rails,
when the total power consumption of the plurality of small processors is below a first threshold value, the total power consumption of the plurality of large processors is above a second threshold value, and the total power consumption of combined small and large processors is above a combined third threshold value.

* * * * *